United States Patent
Keyser et al.

(10) Patent No.: US 10,625,630 B2
(45) Date of Patent: Apr. 21, 2020

(54) VEHICLE SEATING SYSTEM

(71) Applicant: LEAR CORPORATION, Southfield, MI (US)

(72) Inventors: Mark R. Keyser, Lake Orion, MI (US); Curtis Hudson, Macomb, MI (US)

(73) Assignee: Lear Corporation, Southfield, MI (US)

( * ) Notice: Subject to any disclaimer, the term of this patent is extended or adjusted under 35 U.S.C. 154(b) by 56 days.

(21) Appl. No.: 16/026,114

(22) Filed: Jul. 3, 2018

(65) Prior Publication Data

US 2020/0009994 A1 Jan. 9, 2020

(51) Int. Cl.
| | | |
|---|---|---|
| *B60N 2/20* | (2006.01) | |
| *B60N 2/02* | (2006.01) | |
| *B60N 2/22* | (2006.01) | |
| *B60N 2/42* | (2006.01) | |
| *B60N 2/30* | (2006.01) | |

(52) U.S. Cl.
CPC ......... *B60N 2/0276* (2013.01); *B60N 2/0232* (2013.01); *B60N 2/2213* (2013.01); *B60N 2/3011* (2013.01); *B60N 2/4228* (2013.01)

(58) Field of Classification Search
CPC .. B60N 2/0276; B60N 2/0232; B60N 2/2213; B60N 2/3011; B60N 2/4228
USPC ............................................ 297/362, 362.11
See application file for complete search history.

(56) References Cited

U.S. PATENT DOCUMENTS

| | | | | |
|---|---|---|---|---|
| 4,930,841 | A * | 6/1990 | Wittig | B60N 2/20 |
| | | | | 297/362 |
| 5,002,172 | A * | 3/1991 | Stringer | B60N 2/0232 |
| | | | | 192/142 R |
| 6,193,316 | B1 | 2/2001 | Janke et al. | |
| 7,192,089 | B2 | 3/2007 | Boudinot | |
| 7,544,142 | B2 | 6/2009 | Schuler et al. | |
| 7,822,523 | B2 * | 10/2010 | Yoshida | B60N 2/0232 |
| | | | | 701/49 |
| 8,052,215 | B2 * | 11/2011 | Ito | B60N 2/0232 |
| | | | | 297/354.12 |
| 8,672,796 | B2 * | 3/2014 | Schulz | B60N 2/1655 |
| | | | | 192/223.2 |
| 8,783,774 | B2 * | 7/2014 | Berres | B60N 2/0232 |
| | | | | 297/361.1 |
| 9,022,478 | B2 * | 5/2015 | Golarz | B60N 2/225 |
| | | | | 297/362 |
| 10,214,117 | B2 * | 2/2019 | Tanaka | B60N 2/0232 |
| 10,293,709 | B2 * | 5/2019 | Murakami | B60N 2/0232 |
| 2009/0322137 | A1 * | 12/2009 | Kojima | B60N 2/0232 |
| | | | | 297/362 |

(Continued)

FOREIGN PATENT DOCUMENTS

| | | |
|---|---|---|
| GB | 632028 A | 11/1949 |
| WO | 9634696 A1 | 11/1996 |

*Primary Examiner* — Syed A Islam
(74) *Attorney, Agent, or Firm* — Brooks Kushman P.C.

(57) ABSTRACT

A vehicle seating system includes a seat bottom and a seat back pivotably connected to the seat bottom. A first motor may operate to pivot the seat back relative to the seat bottom with a first gearing. A second motor may operate to pivot the seat back relative to the seat bottom with a second gearing. A transmission member may be disposed between the first motor and the second motor such that operation of the first motor drives the first gearing and rotates the elongate transmission member, thereby driving the second gearing.

19 Claims, 3 Drawing Sheets

(56) References Cited

U.S. PATENT DOCUMENTS

| | | | |
|---|---|---|---|
| 2011/0012413 A1* | 1/2011 | Du | B60N 2/2252 |
| | | | 297/362 |
| 2011/0169313 A1* | 7/2011 | Schulz | B60N 2/2251 |
| | | | 297/362 |
| 2013/0009438 A1* | 1/2013 | Stemmer | B60N 2/0232 |
| | | | 297/362 |
| 2014/0183919 A1* | 7/2014 | Hoffmann | B60N 2/2251 |
| | | | 297/362 |
| 2018/0222348 A1* | 8/2018 | Romer | B60N 2/0232 |
| 2019/0111807 A1* | 4/2019 | Hassenpflug | B60N 2/0276 |

* cited by examiner

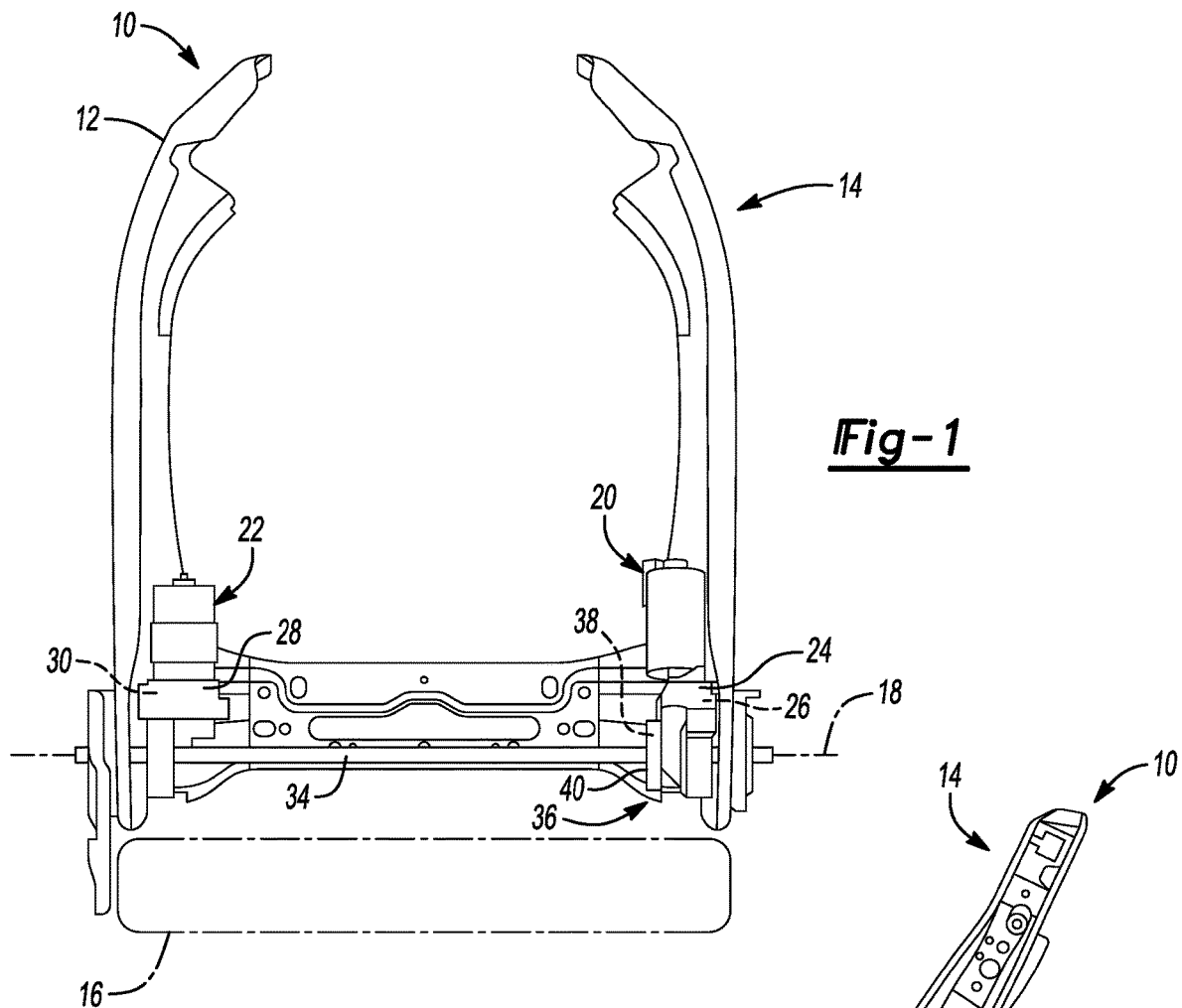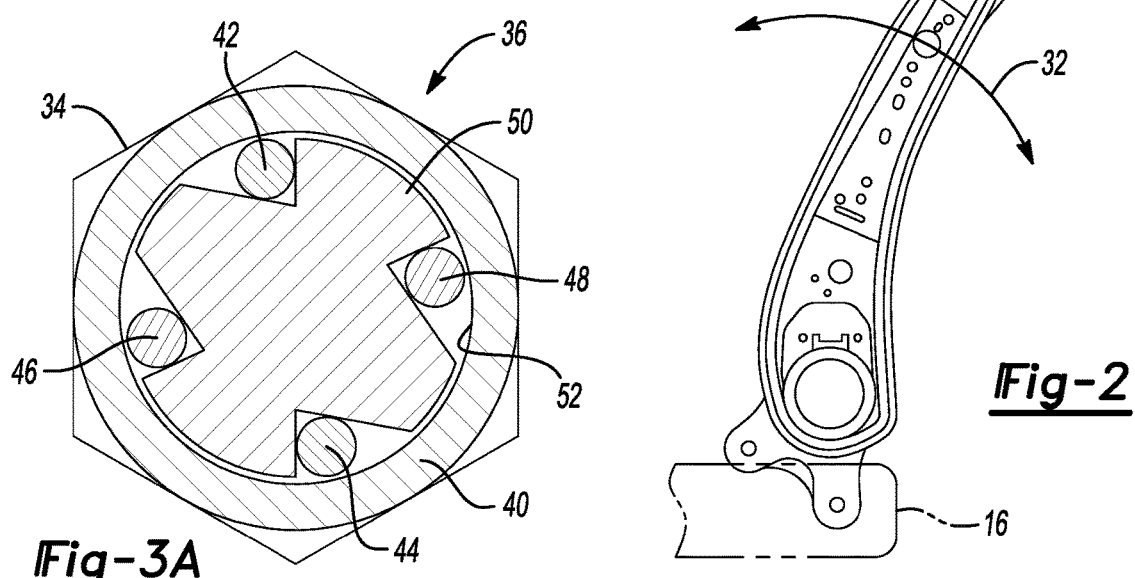

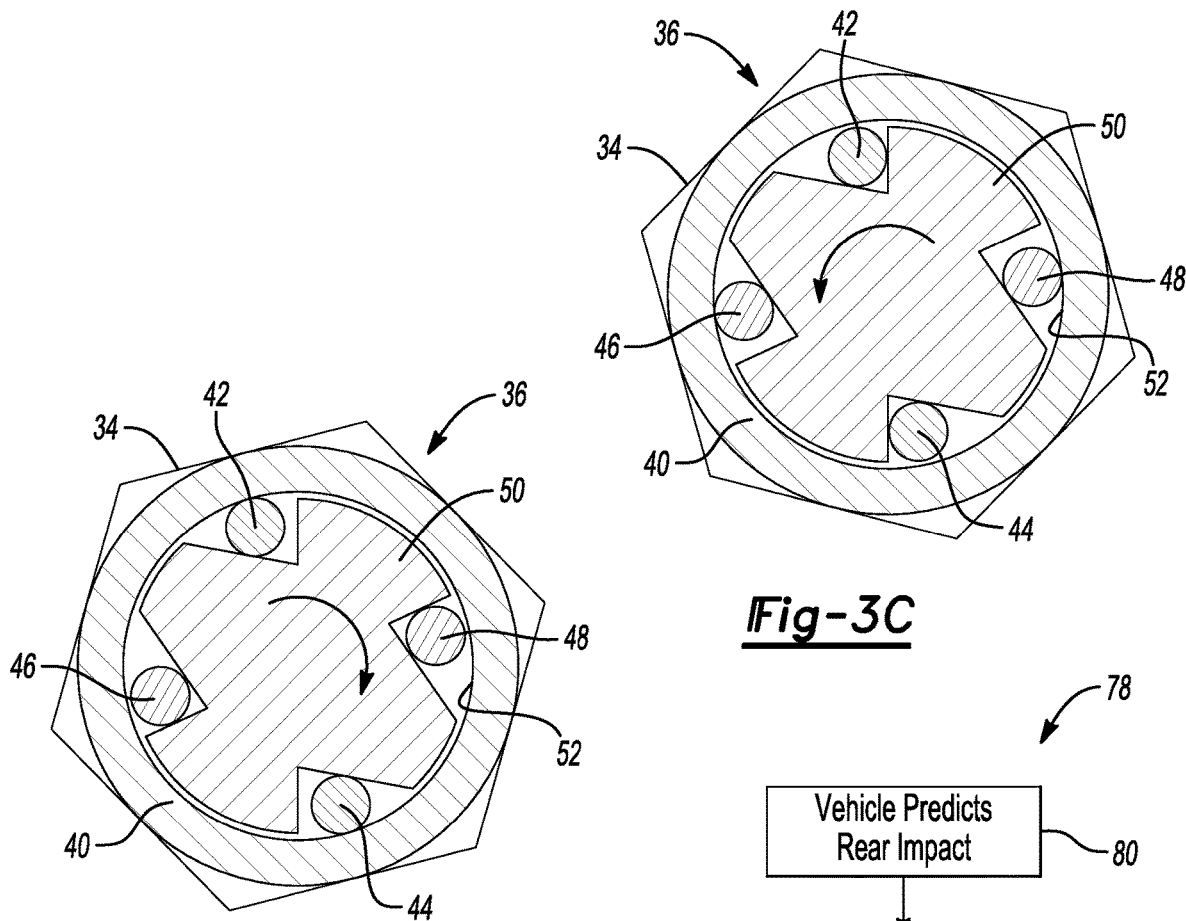
Fig-3C
Fig-3B
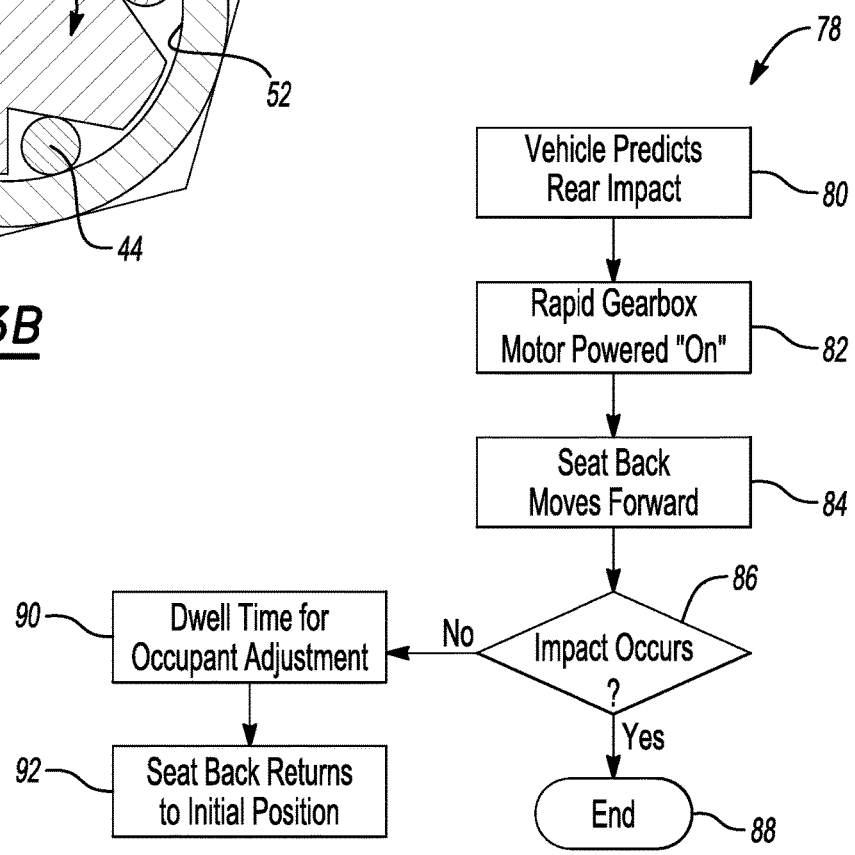
Fig-5

VEHICLE SEATING SYSTEM

TECHNICAL FIELD

The present disclosure relates to a vehicle seating system having a pivoting seat back.

BACKGROUND

A number of systems exist for moving a seat back of a vehicle relative to the seat bottom. The seat back may be moved to provide greater comfort for a vehicle occupant, or for some other reason, such as moving the occupant to a desired position in the event of an anticipated impact. Examples of such systems may be found in one or more of the following references: U.S. Pat. No. 7,544,142B2, U.S. Pat. No. 7,192,089B2, and U.S. Pat. No. 6,193,316B2.

SUMMARY

At least some embodiments described herein may include a vehicle seating system having a seat bottom and a seat back pivotably connected to the seat bottom. A first motor may be operable to pivot the seat back relative to the seat bottom and it may have a first gearing. A second motor may be operable to pivot the seat back relative to the seat bottom and it may have a second gearing. An elongate transmission member may be disposed between the first motor and the second motor such that operation of the first motor drives the first gearing and rotates the elongate transmission member such that the elongate transmission member drives the second gearing.

At least some embodiments described herein may include a vehicle seating system having a seat bottom and a seat back pivotably connected to the seat bottom. The system may include a pair of motors, each operable to pivot the seat back relative to the seat bottom. An elongate transmission member may be engaged with one motor of the pair of motors such that operation of the one motor rotates the elongate transmission member. The elongate transmission member may also be selectively engageable to and disengageable from the other motor of the pair of motors.

At least some embodiments described herein may include a vehicle seating system having a seat bottom and a seat back pivotably connected to the seat bottom. The system may include a first motor having a first gearing and a second motor having a second gearing, with each of the first and second motors being operable to pivot the seat back relative to the seat bottom. A transmission member may be engaged with the second gearing, and selectively engageable to and disengageable from the first gearing. The first motor may be operable to pivot the seat back relative to the seat bottom when the transmission member is engaged with the first gearing.

BRIEF DESCRIPTION OF THE DRAWINGS

FIG. 1 shows a front view of a seating system in accordance with embodiments described herein;

FIG. 2 shows a side view of the seating system shown in FIG. 1;

FIGS. 3A-3C show a clutch from the seating system shown in FIG. 1 in different states of operation;

FIG. 5 shows a flowchart illustrating operation of the seating system shown in FIG. 1.

DETAILED DESCRIPTION

Figure 4:
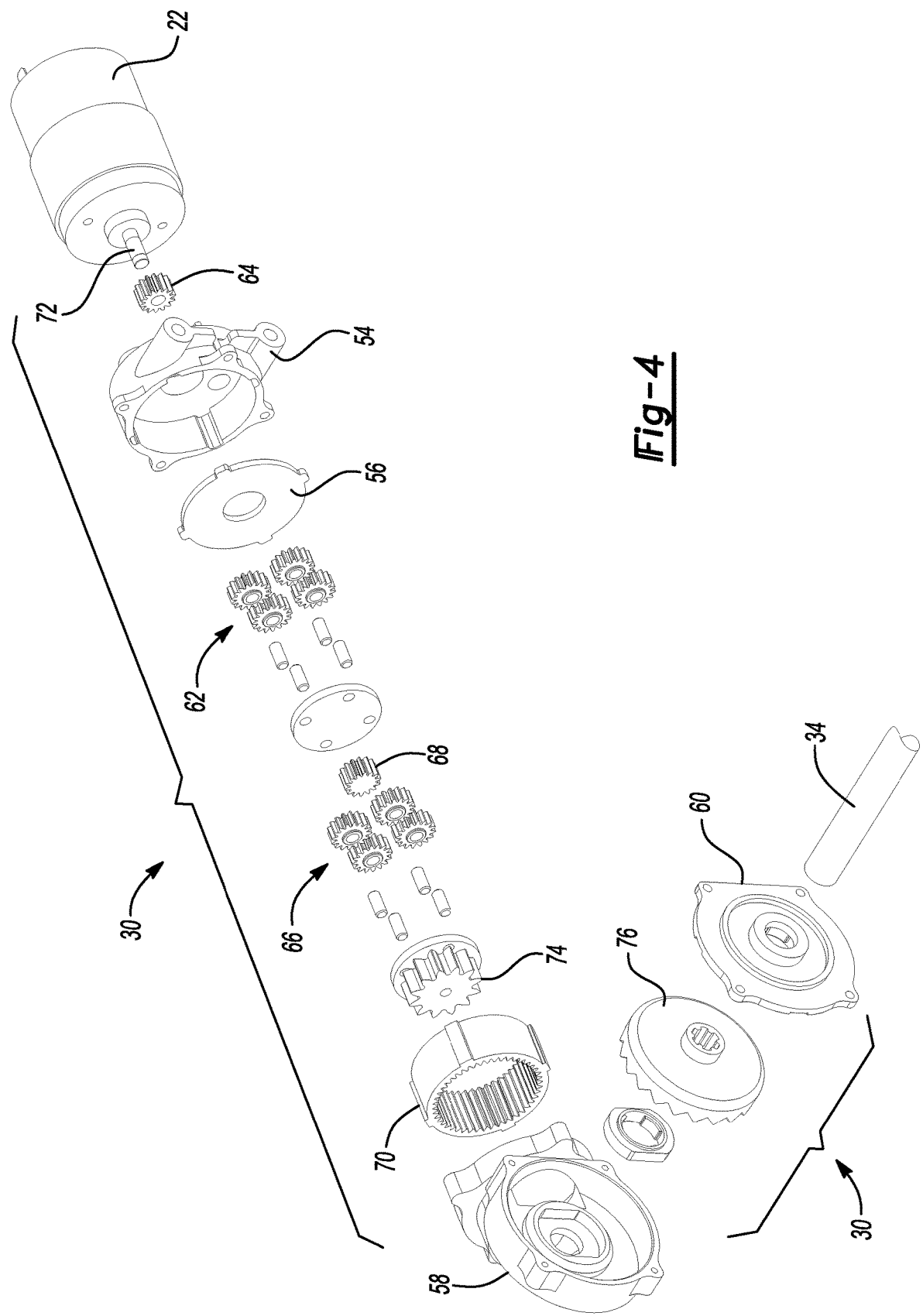
FIG. 4 shows an exploded, perspective view of a motor and gearing from the seating system shown in FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a seating system 10 in accordance with embodiments described herein. In particular, FIG. 1 shows a frame 12 forming a portion of a seat back 14. The seat back 14 is pivotably connected to a seat bottom 16 shown in phantom in FIG. 1. The seat back 14 can be pivoted about an axis 18 using a pair of motors 20, 22. The first motor 20 includes a first gearbox 24 containing a first gearing 26. Similarly, the second motor 22 includes a second gearbox 28 containing second gearing 30. Each of the first and second motors 20, 22 is separately operable to pivot the seat back 14 relative to the seat bottom 16 in either a forward or rearward direction, as indicated by the directional arrow 32 shown in FIG. 2. Also shown in FIG. 1 is an elongate transmission member, which in this embodiment is a transmission member in the form of a torque rod 34 disposed between the first and second motors 20, 22.

Operation of the first motor 20 drives the first gearing 26 and rotates the torque rod 34 such that the torque rod 34 drives the second gearing 30. Conversely, operation of the second motor 22 drives the second gearing 30 and rotates the torque rod 34 without it driving the first gearing 26. This is because there is a clutch 36 disposed between the torque rod 34 and the first gearing 26. Engaging the clutch 36 connects the torque rod 34 with the first gearing 26, but when the clutch 36 is disengaged, there is no connection between them. As explained in more detail in conjunction with FIGS. 3A-3C, in this embodiment, operation of the first motor 20 to pivot the seat back 14 relative to the seat bottom 16 automatically engages the clutch 36.

The clutch 36 includes a first portion 38 connectable to the first gearing 26, and a second portion 40 connected to the torque rod 34. This means that in the embodiment shown in FIGS. 1 and 2, the torque rod 34 is continuously engaged with the gearing of one motor—in this case, the second motor 22—but is selectively engageable to and disengageable from the other motor—in this case, the first motor 20—through the clutch 36. This arrangement provides an effective way to use the motors 20, 22 for different purposes, although in other embodiments they may be used together. Although a clutch, such as the clutch 36, may have a number of different configurations—e.g., a pair of clutch plates making up the first and second portions—the clutch 36 includes a clutch housing and roller bearings that work together to facilitate operation of the clutch and which make up the first and second clutch portions in this embodiment.

In the embodiment illustrated in FIGS. 1 and 2, the first motor 20 may be part of a comfort recliner system that allows a seated occupant to adjust the angle of the seat back 14 to a preferred position. Therefore, the first gearing 26 may be configured such that its output is at relatively low speed. This may provide a desirable level of precision in the adjustment angle for the seated occupant. In contrast, the second motor 22 may be part of an automatic seat-positioning system, such as may be used in a pre-crash situation. One such automatic seat-positioning system is described in U.S. patent application Ser. No. 15/383,361, entitled: System and Method for Positioning a Vehicle Seat, filed on Dec. 19, 2016, and issued on Mar. 26, 2019 as U.S. Pat. No. 10,239,420, and which is incorporated herein by reference in its entirety. As part of an automatic seat-positioning system, the motor 22 and the associated gearing 30 may be configured to provide a much more rapid movement of the seat back 14 than the first motor 20 and its gearing 26.

As described above, operation of the second motor 22 drives the second gearing 30 and the torque rod 34; however, when the clutch 36 is disengaged, the first gearing 26 is not driven by the torque rod 34. Stated another way, operation of the second motor 22 does not "back drive" the first gearing 26 or the first motor 20. In contrast, operation of the first motor 20 automatically engages the clutch 36 and drives the torque rod 34. Because the torque rod 34 is continuously engaged with the gearing 30 of the second motor 22, it back drives the second gearing 30 and the second motor 22. Although different embodiments may employ different configurations for a clutch, such as the clutch 36, one embodiment is illustrated in FIGS. 3A-3C.

FIG. 3A shows a schematic cross-sectional view of the clutch 36 and its interaction with other components of the seating system 10. In particular, the torque rod 34 is shown connected to a clutch housing forming the second clutch portion 40. Four roller bearings 42, 44, 46, 48 forming the first clutch portion 38 are also shown. In the center of the cross section shown in FIG. 3A is an output shaft 50 that is connected through the first gearing 26 to the first motor 20 and its output shaft. In the view shown in FIG. 3A, the motor 20 is idle and the clutch 36 is disengaged. In this arrangement, the torque rod 34 may be driven by the motor 22—for example, in order to implement an automatic seat-positioning adjustment; however, the output shaft 50, and consequently the second gearing 26, will not be driven by the torque rod 34.

As the torque rod 34 rotates, so too does the clutch housing 40; this is because the torque rod 34 is connected to the clutch housing 40. But because there is no connection between the clutch housing 40 and the output shaft 50, the output shaft 50 and the second gearing 26 are not back driven. As shown in FIG. 3A, the roller bearings 42, 44, 46, 48 are not in contact with an inside surface 52 of the second clutch portion 40, and therefore, the torque rod 34 and the clutch housing 40 can rotate around the output shaft 50 without engaging it. In this configuration, none of the first clutch portion 38—i.e., none of the roller bearings 42, 44, 46, 48—are engaged with the second clutch portion, or clutch housing, 40.

FIG. 3B shows operation of the clutch 36 when the output shaft 50 is rotating in a clockwise direction as viewed in the drawing figure. As shown in FIG. 3B, the roller bearings 46, 48 are still disengaged similarly to the positions they occupied when the motor 20 is idle—see FIG. 3A. Conversely, the roller bearings 42, 44 are shown in FIG. 3B as being wedged between a portion of the output shaft 50 and the inside surface 52 of the clutch housing 40. During this operation, the roller bearings 42, 44 securely engage the clutch housing 40, causing it to rotate in the same direction—i.e., clockwise—as the output shaft 50. Then, because the torque rod 34 is connected to the clutch housing 40, it also rotates in a clockwise direction. In this configuration, the first clutch portion 38—in this case, the roller bearings 42, 44—is engaged with the second clutch portion, or clutch housing, 40.

The opposite arrangement occurs during a counterclockwise rotation of the output shaft 50, and this is shown in FIG. 3C. During this operation, the roller bearings 42, 44 are disengaged, while the roller bearings 46, 48 are wedged between the output shaft 50 and the inside surface 52 of the clutch housing 40. This causes the clutch housing 40 to rotate with the output shaft 50, and in turn, causes the torque rod 34 to also rotate in a counterclockwise direction. In this configuration, the first clutch portion 38—in this case, the roller bearings 46, 48—is engaged with the second clutch portion, or clutch housing, 40.

Depending on the desired adjustment of the seat back 14—i.e., a forward or rearward adjustment—the motor 20 will rotate in a direction that causes the output shaft 50 to rotate in either a clockwise or counterclockwise direction. In either case, operation of the motor 20 causes rotation of the output shaft 50, and one of the sets of roller bearings 40, 42 or 46, 48—i.e., the first clutch portion 38—automatically engages the second clutch portion 40 and rotates the second clutch portion 40 with the output shaft. The torque experienced by the torque rod 34 as a result of the operation of the motor 20 transfers into the second gearing 28 such that its gears are back driven.

FIG. 4 shows an exploded view of the second motor 22 and the second gearing 30. Housing members 54, 56, 58, 60 form at least a part of the gearbox 28 shown in FIG. 1. The second gearing 30 includes two planetary gearsets, a first of which includes a set of planet gears 62 and a sun gear 64. The second planetary gearset includes a second set of planet gears 66 and a sun gear 68. The two planetary gearsets share a common ring gear 70. As shown in FIG. 4, the second motor 22 includes a motor shaft 72 that is positioned transversely to the torque rod 34. In order to transfer rotation of the motor shaft 72 to the transversely-positioned torque rod 34, the second gearing 30 includes a pinion 74 and a face gear 76. Thus, the second gearing 30 transfers rotation of the motor shaft 72 to rotation of the torque rod 34 through at least the pinion and face gear arrangement.

One alternative to this arrangement would be to use two bevel gears, but the configuration of the seating system 10 requires the second gearing 30 to be back driven when the torque rod 34 is rotated by the first motor 20. Using bevel gears may introduce significant efficiency losses, for example, because of an increased friction as compared to the pinion 74 and face gear 76 arrangement. Because packaging constraints in vehicle seating systems often dictate the transverse arrangement between the motor output and the torque rod, having an in-line output between the motor shaft and the torque rod may not be possible. Therefore, using a pinon and face gear arrangement, such as shown in the embodiment illustrated in FIG. 4, may provide an efficient and effective configuration for allowing the gearing to be back driven.

FIG. 5 shows a flowchart 78 illustrating an embodiment of an implementation of a seating system, such as the seating system 10 illustrated and described above. For purposes of describing this implementation, the system 10 and its various components will be referenced. The flowchart 78 shows a number of steps that may be performed in the event of a potential rear impact. In such a situation, the second motor 22 may be dedicated to an automatic repositioning system. At step 80, a vehicle sensor system predicts a rear impact—e.g., it detects a possible rear impact. Then, at step 82 the rapid gearbox motor—i.e., the second motor 22—is operated. This moves the seat back 14 as shown at step 84. Depending on the pre-crash system that is incorporated into the vehicle, a seat back, such as the seat back 14, can move up to 18° forward in less than 1200 milliseconds (ms). In other embodiments, a greater amount of travel and a different speed—i.e., slower or faster—may be used.

At decision block 86, a determination is made as to whether an impact actually occurred; if it did, the processes ends at step 88. If, however, a crash did not occur, a certain amount of dwell time is provided at step 90 for the vehicle occupant to adjust to what may have been a near-crash situation. At step 92, the seat back 14 returns to its previous position—i.e., its position before the pre-crash operations were implemented. In situations where the seat back 14 is operated for purposes of comfort adjustment, a vehicle occupant may operate a switch that would operate the first motor 20. As described above, operation of the first motor 20 automatically engages the clutch 36, and more particularly, causes the first clutch portion 38 to engage with the second clutch portion 40. The torque rod 34 would be driven, and the torque it produces would be transferred into the second gearing 30, causing the second gearing 30 and the second motor 22 to be back driven. As described above, having a pinon and face gear arrangement such as illustrated in FIG. 4 may provide an efficient and effective configuration, even though back driving other types of gearing may result in undesirable efficiency losses.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seating system comprising:
a seat bottom;
a seat back pivotably connected to the seat bottom;
a first motor operable to pivot the seat back relative to the seat bottom and having a first gearing;
a second motor operable to pivot the seat back relative to the seat bottom and having a second gearing; and
an elongate transmission member disposed between the first motor and the second motor such that operation of the first motor drives the first gearing and rotates the elongate transmission member such that the elongate transmission member drives the second gearing, and
wherein the elongate transmission member is disposed between the first motor and the second motor such that operation of the second motor drives the second gearing and rotates the elongate transmission member without the elongate transmission member driving the first gearing.

2. The vehicle seating system of claim 1, further comprising a clutch disposed between the elongate transmission member and the first gearing such that engaging the clutch connects the elongate transmission member with the first gearing.

3. The vehicle seating system of claim 2, wherein operation of the first motor to pivot the seat back relative to the seat bottom automatically engages the clutch.

4. The vehicle seating system of claim 1, wherein the second motor includes a motor shaft positioned transversely to the elongate transmission member, and the second gearing transfers rotation of the motor shaft to rotation of the elongate transmission member through at least a pinon and face gear arrangement.

5. The vehicle seating system of claim 1, further comprising a clutch having a first portion selectively connectable to the first gearing and a second portion connected to the elongate transmission member, the first portion being disengaged from the second portion during operation of the second motor.

6. The vehicle seating system of claim 5, wherein operation of the first motor automatically engages the first portion of the clutch with the second portion of the clutch.

7. A vehicle seating system comprising:
a seat bottom;
a seat back pivotably connected to the seat bottom;
a pair of motors, each operable to pivot the seat back relative to the seat bottom; and
an elongate transmission member:
engaged with one motor of the pair of motors such that operation of the one motor rotates the elongate transmission member, and
selectively engageable to and disengageable from the other motor of the pair of motors.

8. The vehicle seating system of claim 7, wherein each of the motors has a respective gearing, and the elongate transmission member is continuously engaged with the gearing of the one motor such that when the elongate transmission member is rotated by the other motor, the elongate transmission member rotates the gearing of the one motor.

9. The vehicle seating system of claim 8, wherein the elongate transmission member is selectively engageable to and disengageable from the gearing of the other motor such that operation of the one motor drives the gearing of the one motor without the elongate transmission member driving the gearing of the other motor.

10. The vehicle seating system of claim 9, wherein operation of the other motor to pivot the seat back relative to the seat bottom automatically engages the gearing of the other motor with the elongate transmission member.

11. The vehicle seating system of claim 8, wherein the one motor includes a motor shaft positioned transversely to the elongate transmission member, and the gearing of the one motor transfers rotation of the motor shaft to rotation of the elongate transmission member through at least a pinon and face gear arrangement.

12. The vehicle seating system of claim 8, further comprising a clutch having a portion connectable to the gearing of the other motor and a portion connected to the elongate transmission member, the portion connectable to the gearing of the other motor being disengaged from the portion connected to the elongate transmission member during operation of the one motor.

13. The vehicle seating system of claim 12, wherein operation of the other motor automatically engages the portion connectable to the gearing of the other motor with the portion connected to the elongate transmission member.

14. A vehicle seating system comprising:
a seat bottom;
a seat back pivotably connected to the seat bottom;
a first motor having a first gearing and a second motor having a second gearing, each of the first and second motors being operable to pivot the seat back relative to the seat bottom; and
a transmission member engaged with the second gearing, and selectively engageable to and disengageable from the first gearing, the first motor being operable to pivot the seat back relative to the seat bottom when the transmission member is engaged with the first gearing.

15. The vehicle seating system of claim 14, wherein operation of the first motor automatically engages the transmission member with the first gearing.

16. The vehicle seating system of claim 14, wherein operation of the first motor to pivot the seat back relative to the seat bottom drives the first gearing and drives the second gearing through the transmission member.

17. The vehicle seating system of claim 14, wherein operation of the second motor to pivot the seat back relative to the seat bottom drives the second gearing and rotates the transmission member without driving the first gearing.

18. The vehicle seating system of claim 14, further comprising a clutch having a first portion connectable to the first gearing and a second portion connected to the transmission member, the first portion being disengaged from the second portion during operation of the second motor.

19. The vehicle seating system of claim 18, wherein operation of the first motor automatically engages the first portion of the clutch with the second portion of the clutch.

* * * * *